United States Patent [19]

Miller et al.

[11] 4,199,747
[45] Apr. 22, 1980

[54] TRANSMISSION SHIFT-POSITION INDICATING SYSTEM FOR MOTOR TRUCKS

[76] Inventors: Scott Miller, 3111 Thornfield Rd., Baltimore, Md. 21207; Larry R. Whitfield, 1560 Sherwood Ave., Baltimore, Md. 21239

[21] Appl. No.: 915,722

[22] Filed: Jun. 15, 1978

[51] Int. Cl.² .............................................. B60Q 1/26
[52] U.S. Cl. ................................... 340/74; 200/61.88; 340/79
[58] Field of Search ...................... 340/74, 70, 87, 80, 340/52 R, 79; 200/61.88; 362/71, 61

[56] References Cited

U.S. PATENT DOCUMENTS

| | | | |
|---|---|---|---|
| 1,436,507 | 11/1922 | Londe | 200/61.88 |
| 3,332,061 | 7/1967 | Levitz | 340/74 |
| 3,910,388 | 10/1975 | Moori et al. | 200/61.88 |
| 4,022,078 | 5/1977 | Malott | 200/61.88 |
| 4,037,196 | 6/1977 | Atkinson et al. | 340/70 |
| 4,063,217 | 12/1977 | Hyde et al. | 340/70 |

*Primary Examiner*—Donald J. Yusko
*Attorney, Agent, or Firm*—John F. McClellan, Sr.

[57] ABSTRACT

A digital readout gearshift indicator for motor trucks, automobiles and other vehicles fitted with manual transmission and gear shift lever, and the like of both tipping cab and fixed cab types, which provides easy after-market installation with minimum adaptation of vehicle needed, and which is well suited for original-equipment installation, includes a gearshift lever position sensing array of switches with adjustable mounting for vehicle floor installation, cooperating with shift-knob position responsive contacts for operatively controlling a digital read-out display for clearly indicating in luminous numerals on the dashboard which of multiple gears in ranges the vehicle transmission is shifted to, enabling drivers to avoid transmission gearing damage with results from shifting out of sequence.

5 Claims, 4 Drawing Figures

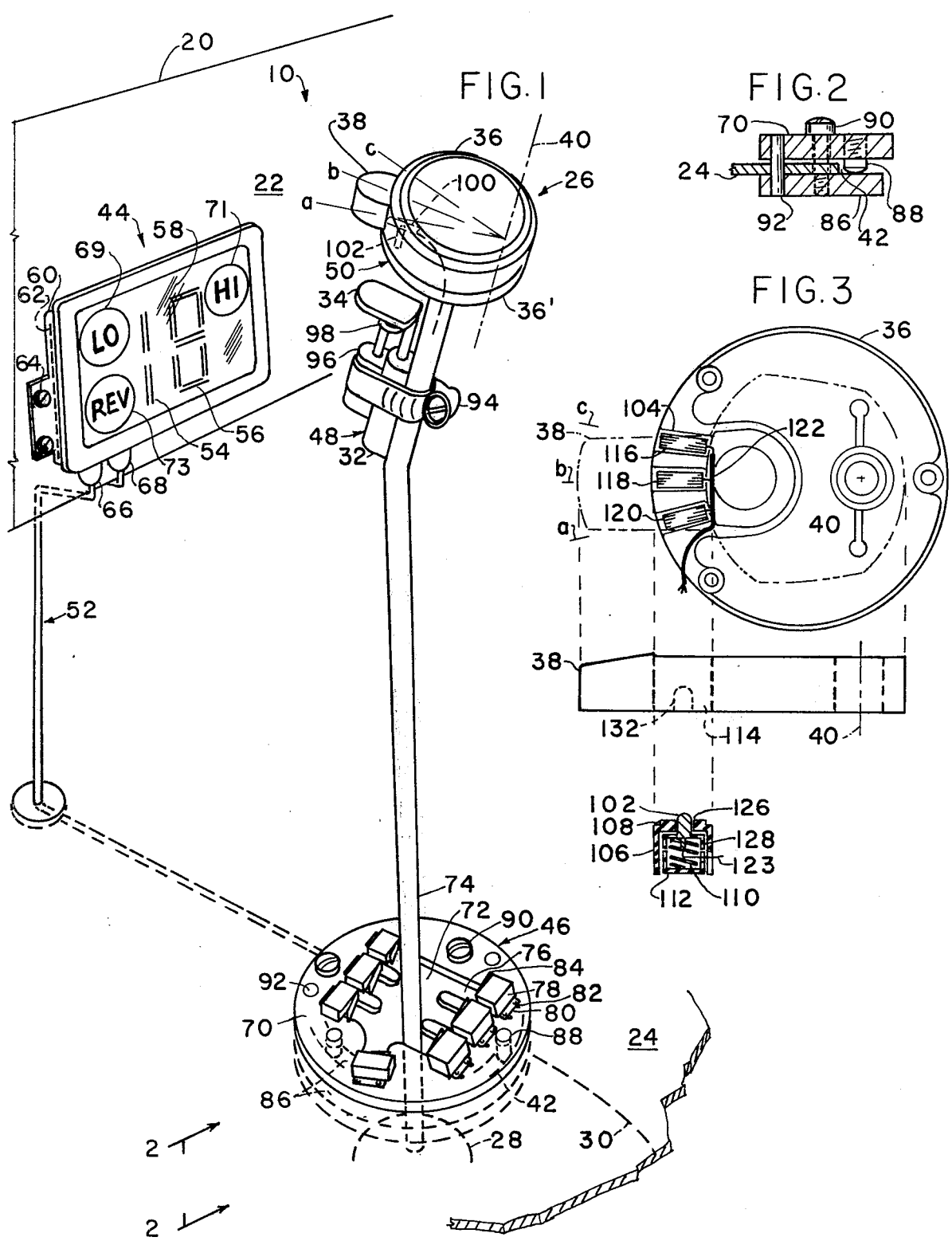

TRANSMISSION SHIFT-POSITION INDICATING SYSTEM FOR MOTOR TRUCKS

This invention relates generally to indicators and specifically to motor vehicle transmission setting indicators.

In the prior art digital readout systems are known to display information numerically, and numerical display of transmission positions in motor vehicle is known.

However, it is also known that to the present time no system of gearshift information has been adopted which satisfactorily provides the gear-selection information needed for drivers to eliminate transmission damage caused by out-of sequence manual shifting in motor vehicles such as twelve to fifteen gear over the road tractors for trailers and the like.

Existing systems for indicating position either fail to provide clearly understood indication or else are too costly to install and adjust, or do not readily fit the vehicles most frequently employed and with which drivers are most familiar.

Principal objects of this invention therefore are to supply a system which provides for the driver clear, reliable, easily understood indication of transmission status, at reasonably cost, which is easy to instal and adjust on motor trucks of most types in original equipment and in after-market applications, and which is durable, flexibly adaptable and reliable.

In brief summary given as cursive description only and not as limitation, the invention includes lever position responsive switches, including a ring-mounted array for floor board installation and knob-associated elements, for coacting to produce dashboard digital-display of transmission shift position.

The above and other objects and advantages of this invention will become more readily understood on examination of the following drawings in which like reference numerals indicate like parts.

FIG. 1 is a perspective diagram of installation of the invention in the cab of an over-the-road tractor;

FIG. 2 is an elevational sectional detail adapted from 2—2, FIG. 1;

FIG. 3 is an exploded diagram with uppermost element rotated to show relation of parts in overdrive shift knob adaptation.

Figure 4:
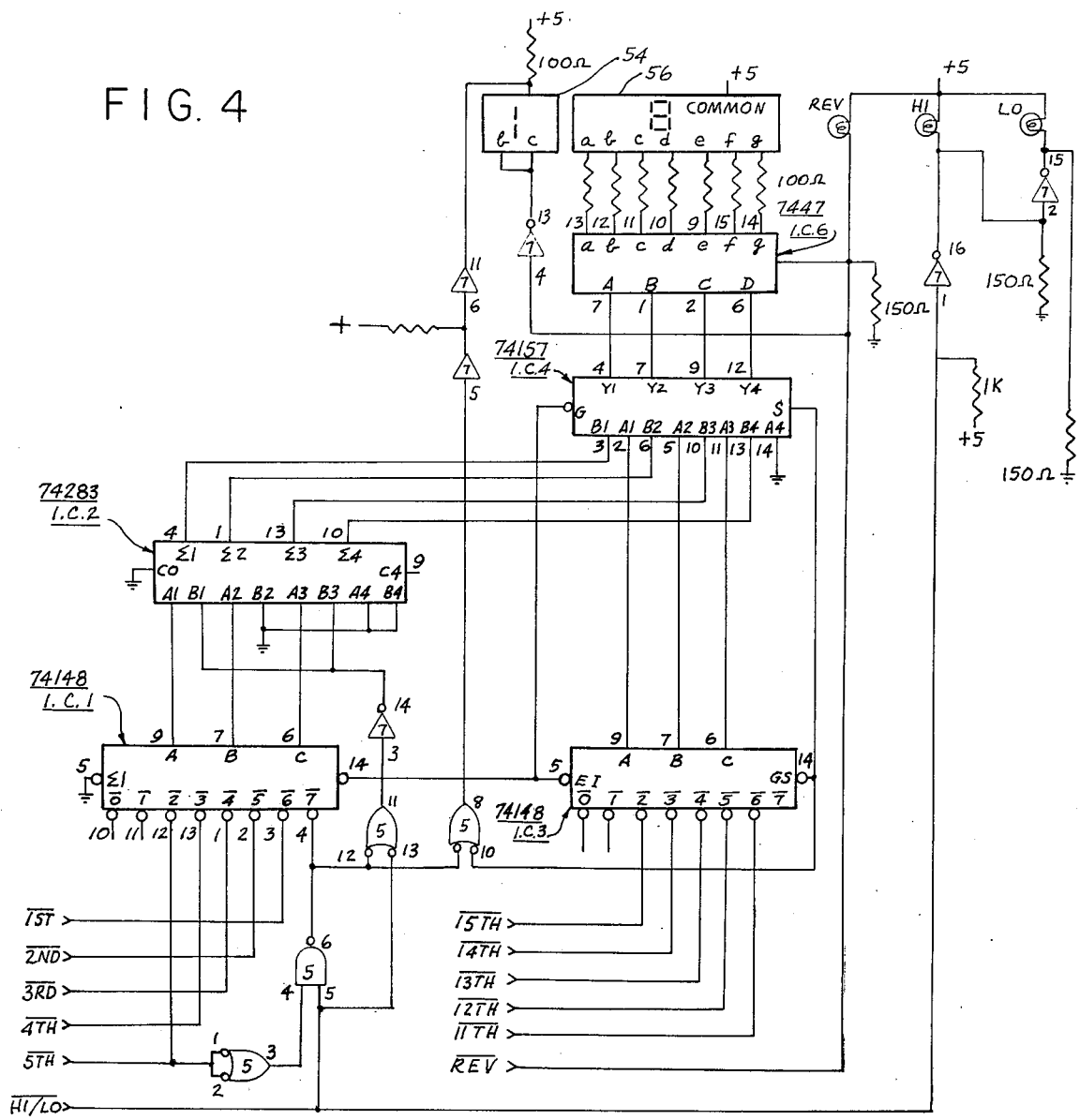
FIG. 4 is a circuit diagram.

FIG. 1 shows the invention 10 installed in a motor truck, trailer-tractor or the like, of the type having a cab 20 including dashboard 22 and floor 24 which tip forward for servicing, leaving the gearshift lever assembly 26 attached to the shift universal joint 28 on the transmission 30 beneath the level of the floor of the cab.

Conventional shift provisions are complex and hard to read the position of in changing traffic situations. A high-low range switch 32 will lift-to-change knob 34 is a conventional provision on over-the-road tractors, as is a shift knob 36 (lower half 36') having a tab 38 rotatable about an upright axis 40 to shift to the successive overdrive positions, in addition to the shift lever positionable to several shift-position, usually at least five forward and one reverse.

A circular opening 42 in the cab floor 24 permits tipping the cab for service, leaving the gear shift lever undisturbed.

STRUCTURE OF THE INVENTION

In accordance with the invention an easily made adaptation to the existing, typical electro-pneumatic shift structure just described comprises the following major adaptive subassemblies:

(a) digital readout 44;
(b) lever sensor assembly 46;
(c) range sensor assembly 48;
(d) overdrive sensor assembly 50;
(e) circuitry 52 interconnecting the above for synchronizing the output.

It will be appreciated that all these adapters coact to give a compatible unitary system of shift-position indication in spite of the complexity of the underlying tractor provisions which must be dealt with in the usual over-the-road or long-haul vehicle.

(a) DIGITAL READOUT 44

The digital readout comprises in preferable embodiment, first 54 and second 56 character forming arrays behind a transparent panel front 58 of a chassis 60 containing the integrated circuitry 62 of the invention; preferably the chassis can be detachably dashmounted as by screws 64 and the circuitry leads are through detachable connectors to the chassis, including both signal-lead connector 66 and power connector 68 to the vehicle electrical supply. "Low" and "high" and "reverse" indicators 69, 71, 73 supply additional information valuable in avoiding confusion by verifying position in terms other than gear number, and indicate the ease with which the invention can be made to function as a "split-shift" indicator, showing "first-low" then "first-high", then "second-low", "second-high" etc. in progressive sequence.

The lever sensor assembly includes, coaxial with the circular hole in the cab floor, a pair of circular plates. The upper plate 70 has a central opening 72 from which gear shift lever 74 swings when shifting into a plurality of gate-apertures 76 representing the various positions of shift within the high-low ranges. Reverse is diagonally down-at-the-left. Conventional shift sequence through the forward gears of the structure shown is: first: upperleft; second: lower left; third: upper middle; fourth: lower middle; fifth: upper right, then after shifting to the high range, repeating this sequence from sixth through tenth gear in the high ranges (some vehicles have more) before advancing to overdrive, which will be described later.

At each of the gate apertures a spring-return or intermittent switch 78 is mounted adjustably as by flange 80 having screw-in-slot structure 82 transversely to slot structure in the upper plate, with the switch arm 84 in the path of the lever 74 so that on depression it transmits position of the lever through wiring 52 for processing at 62 and digital display at 44.

Lower plate 86 is ring-shaped and mounts by screws beneath the cab floor and concentric with the clearance hole 42 in the floor; it has clearance for the lever at all positions but is smaller than the clearance hole in the floor by an amount sufficient to receive and support three studs or feet 88 extending downwardly through the hole from the upper plate to which they are affixed as by screw threads. These feet bear laterally, on the perimeter of the circular hole and so locate the upper plate concentrically but rotationally with respect to it, permitting rotational adjustment about the gear shift lever axis, of the upper plate and gates. Bolts 90 in oversize holes for adjustment hold the two plates together, and pins 92 fix the rotational position of the upper plate. It is evident that to adapt better the height of the gates above the pivot of the shift may beneficially be adjustable, and that the height of the studs or feet may be adjusted for this, or different foot-height substituted to suit the installation. The upper plate, in other words, can be adjusted higher or lower by this means.

(b) RANGE SENSOR ASSEMBLY 48

Mounted to the high-low range switch 32 as by adjustable hose-clamp 94 is an intermittent or spring-return high-low indicator switch 96 with actuating plunger 98 extending from the top to a location normally depressed by the normally-down range selector knob 34, when it indicates low-range selection. When the range selector knob is lifted to high range position the plunger 98 rises to convey high-range selection at the display, by gear number.

(c) OVERDRIVE SENSOR ASSEMBLY 50

A typical overdrive gear shift knob 36 is shown, such as that manufactured by Teledyne Corporation as model A-4487, and sold under the mark "Fuller Roadranger". With overdrive selector tab 38 in the position shown, the overdrive gear selected is "low" gear.

When overdrive selector tab is moved from the position shown to position b, the vehicle transmission shifts to 12th gear; then similarly to 13th at the next rotational position, etc. Some vehicles have twenty gears.

To sense these positional changes, the display circuitry in typical embodiment provides a switch contact 100 at each overdrive position and a wiper terminal 102 on the overdrive selector tab 38 which closes a sub-circuit in turn for each terminal, indicating to the display circuitry the overdrive gear in use at any particular time.

FIG. 2 is a detail showing the relation of upper plate 70, floor 24 at floor circular opening 42, lower plate 86, pin 92, stud or foot 88, and bolt 90 holding the parts together.

FIG. 3 depicts the upper half of the typical gear shift knob assembly 36, 38 with adaptive components; according to this invention the lower half (first figure) of knobs of this type remain unaffected, only the small components in the upper half 36 are modified, and that only slightly and after simple removal of the screws which normally retain the assembly together by uniting the upper and lower halves of the knob assembly.

Unmodified, the typical knob assembly upper half 50 overdrive selector tab 38 pivoted at 40 to swing between various positions a, b, c, etc. depending on number of positions.

Each position is defined by a groove 104 in the bottom of the upper part 36 of the gearshift knob, to define three positions. A detent assembly comprising a square-section plastic cup 106 with at the top an integral flange 108 proportioned for fitting into the grooves in turn, includes internally a detent spring 110 in a dielectric spring-cup 112 at the bottom, both of which fit into the square, perpendicular opening 114 in the overdrive selector tab 38 adjacent the protrusive end, and under pressure of the lower half of the knob assembly resiliently force flange 108 into the particular groove with which opposed.

Modification according to this invention comprises simply affixing three thin contacts 116, 118, 120 or terminals in the respective deep grooves 104, as by epoxy cementing, and running a lead from each in a cable 122 with the previously described circuitry 52. Together with this, is run also to the circuitry a lead 123 from copper pin or contact 102 held protrusively and slidably within top bore 126 in flange 108 by affixation with cement or screw threads or both within the top of cup member 128. Lead 123 comes laterally out of the cup as indicated, and through notch 132, then down the shaft with the other wiring; this may be on the far side in the first figure.

On assembly, the position of the overdrive selector tab 38 is thus indicated to the display circuitry. All leads from this and the high-low switch may be run down the far side of the gearshift lever in the first figure and under the floorboard in manner permitting cab tipping without disassembly, the pivot point being indicated by the grommet beneath the display panel, for example.

FIG. 4 shows the wiring schematic, one of any of conventional interconnections which could be used, the only novelty being in the principles of the invention above described and herein carried out, not in the circuitry per se. Conventional integrated circuit components and component designations are used.

The position of the gearshift lever is detected by taking one of the five inputs of I.C.1 to ground. Integrated circuit I.C.1 is a 74148 which is an 8 input priority encoder and will convert the grounded input into its binary equivalent e.g. grounding pin 2 will output 0010 on pins 9, 7 and 6. Also when an input is activated, signal GS will go to a zero to detect the presence of an input being used.

The output of I.C.1 then goes through I.C.2, which is a 74283 full binary adder, taking the encoded position and adding zero to it if the HI/LO switch is in low, or adding the count of five if in the high range. Thus if 2nd gear is active and LO is selected, the output of I.C.2 will be 0010 (binary two) and if in the high position the output will be 0111 which represents binary 7.

The overdrive encoder, I.C.3 is a 74148, and works in the same fashion as I.C.1. However, this device will not give an output until EI pin 5 is at zero level. This means that a gear position must be selected on I.C.1. Therefore, if a gear position is active, a binary output equal to the least significant digit of the overdrive position selected is available as the output of I.C.3.

I.C.4 is an 74157 quad two input multiplexer, and it functions to select which set of digits (gear position or overdrive position) is to be displayed.

I.C.5 is a 7400.

I.C.6 is a 7447 which converts binary coded decimal information into 7 segment display drive at 56. This means that numbers 0 through 9 will be displayed depending on its input.

I.C.7 is a ULN2003, comprising 7 high current drivers used for signal inversion and lamp driving.

THE SEQUENCE OF EVENTS IS SUCH

A. NEUTRAL—If no input exists in I.C.1 (neutral position) output GS pin 14 will be high. This means that I.C.3 will be inactive, also I.C.4 pin 15 will disable the multiplexer causing binary 0000 to be applied to the 7 segment driver I.C.6 forcing the display to decimal zero. Pins 9 and 10 of I.C.5 are also both high causing Pin 8 to be low. This signal is inverted twice by I.C.7 so that pin 11 is on ground shorting the most significant digit at 54 and causing it to extinguish.

B. LO RANGE (gears 1 thru 5)—With ground applied to pin 5 of I.C.5, input 7 is disabled and pin 13 of I.C.5 forces pin 11 high which is inverted by I.C.7 pin 3 and 14. This caused a bias of 0 to be added to the sum. I.C.4 is now enabled on pin 15 and since overdrive is not selected, pin 14, GS, on I.C.3 is high allowing that channel to be selected for display via select line pin 1 of I.C.4.

Also pin 1 of I.C.7 is low causing its output, pin 16 to go high not lighting. This HI lamp (lamps may be "MURALITE" PTL 6/6) which is inverted again by pin 2 and 15 lighting the LO lamp.

C. HIGH RANGE (gears 6 thru 10)—Pin 13 of I.C.5 is now high enabling a bias of 5 to be added to the results of positions 1 through 4 resulting in a display of 6-9. I.C.5 pin 6 goes low which
 (1) Selects pin 4 on I.C.1 causing result 000.
 (2) Pin 12 on I.C.5 goes low removing the adder bias.
 (3) Pin 9 on I.C.5 goes for turning on the most significant digit of one, thus display 10. Also HI/LO indicators are not inverted causing the HI indicator to light.

D. OVERDRIVE (gears 11 thru 15)—When I.C.3 pin 5 is enabled, any input from the overdrive switch will drive GS pin 14 low 1) causing I.C.4 to select overdrive inputs and 2) driving I.C.5 pin 10 low to activate the most significant digit.

E. REVERSE—Taking the reverse switch to ground, forces the seven segment driver, I.C.6 to a blanking mode via pin and current is removed from the most significant digit via I.C.7 pin 13. The reverse lamp being tied directly to the switch is now forced to the "on" indication.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for transmission shift-position-indicating in a motor vehicle having: a shift position display, a lever for manual gear shifting on movement in sequence into plural respective gate positions; the lever including a shift knob, the shift knob having a tab rotatable relative thereto for selecting overdrive settings, and a range selector below the shift knob and having a portion movable vertically between a first or high-range setting and a second or low-range setting of the transmission, the improvement comprising: a frame having plural gate positions, a plurality of switching means, means adjustably mounting a respective said switching means on said frame at each gate position in the path of said gear shifting movement for contact by said lever, said switch position display comprising a digital display, means operatively connecting each said switching means for causing said digital display to indicate a respective number for each lever contact in said sequence, the frame having an opening therein for receiving said lever, said lever having pivotal attachment below the frame, means for vertically adjusting the frame relative to said gear shifting movement for simultaneously setting the position of all said switching means, means for individually adjusting plural of said switching means relative to the frame, said tab having plural switching positions corresponding to respective said overdrive settings, and said means operatively connecting having further connection for causing said digital display to indicate in said sequence each switching position as an overdrive setting.

2. In a system as recited in claim 1, said further connection including the tab carrying therewith a contact, the shift knob having a plurality of terminals in grooves therein, the terminals located for respective switching-engagement by the contact upon said overdrive setting selection.

3. In a system as recited in claim 2, a switch, means adjustably mounting the switch adjacent the range selector in location responsive to movement of said portion of the range selector, and said means operatively connecting having still further connection for causing said digital display to indicate each respective setting of the range selector.

4. In a system as recited in claim 3, said range setting indication by the digital display including a "high" indication and a "low" indication.

5. In a system as recited in claim 4, said means adjustably mounting the switch comprising a clamp around the switch and the lever.

* * * * *